United States Patent [19]

Teramachi

[11] 4,309,061
[45] Jan. 5, 1982

[54] UNLIMITED SLIDING BALL SPLINE ASSEMBLY

[76] Inventor: Hiroshi Teramachi, 2-34-8, Higashi-Tamagawa, Setagaya-ku, Tokyo, Japan, 158

[21] Appl. No.: 110,989

[22] Filed: Jan. 10, 1980

[30] Foreign Application Priority Data

Jan. 20, 1979 [JP] Japan .................................. 54-4462

[51] Int. Cl.³ ............................................. F16C 29/06
[52] U.S. Cl. .................................................. 308/6 C
[58] Field of Search ........................................ 308/6 C

[56] References Cited

U.S. PATENT DOCUMENTS

| | | | |
|---|---|---|---|
| 1,918,108 | 7/1933 | Jonkhoff | 308/6 C |
| 3,897,982 | 8/1975 | Teramachi | 308/6 C |
| 4,127,309 | 11/1978 | Teramachi | 308/6 C |
| 4,165,195 | 8/1979 | Teramachi | 308/6 C |

FOREIGN PATENT DOCUMENTS

| | | | |
|---|---|---|---|
| 2838481 | 5/1979 | Fed. Rep. of Germany | 308/6 C |
| 1314946 | 12/1962 | France | 308/6 C |

*Primary Examiner*—Richard R. Stearns
*Attorney, Agent, or Firm*—George B. Oujevolk

[57] ABSTRACT

An unlimited sliding ball spline assembly, i.e., a ball spline assembly, has through holes for non-loaded balls formed in an outer sleeve on the extensions of lines connecting loaded balls, spline shaft bearing surfaces for loaded balls and the non-loaded balls. Its contact angle is rendered as close as possible to the direction of torque to make the torque transfer greater. Each of the through holes for the non-loaded balls are axially spaced from its adjacent through holes a distance which is required for allowing the balls to change their travelling direction. The outer sleeve has grooves in its inside wall surface. On the side walls of the grooves is formed an axially-extending curved bearing surface for loaded balls. A ball holder with slits is located within the outer sleeve which prevents loaded balls travelling on the bearing surfaces of the outer sleeve from falling down. Tongues are disposed at each end of each of the slits. A pair of end members are also attached to both end faces of the outer sleeve. Each end member defines grooves in the inner surface thereof, which grooves are required to change the travelling direction of loaded or non-loaded balls which are guided by the ball holder.

4 Claims, 4 Drawing Figures

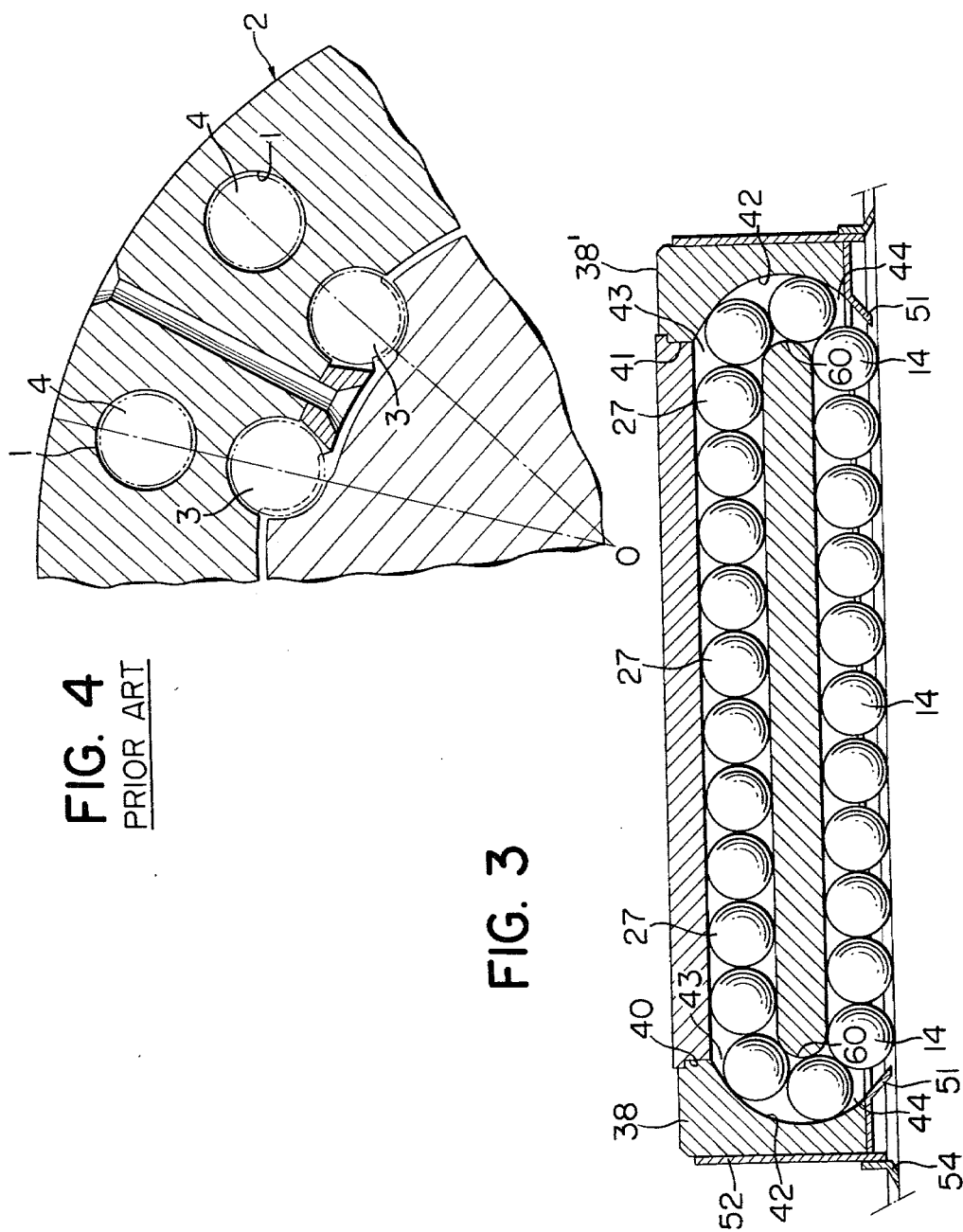

UNLIMITED SLIDING BALL SPLINE ASSEMBLY

BACKGROUND OF THE INVENTION

The present invention relates to an unlimited sliding ball spline assembly (hereinafter, referred to as "ball spline assembly" for simplicity) adapted to receive a spline shaft therein. Such a ball spline assembly can be incorporated, as a united body, into machine tools, industrial machines and transportation apparatus. Those machines and apparatus can be used very efficiently and the fields of their use can be broadened by the adoption of a ball spline assembly contemplated herein.

More specifically, this invention relates to an improved ball spline assembly in which a ball spline bearing can be made to slide while holding both ends of a spline shaft or the torque of the spline shaft can be transmitted to the ball spline bearing, or the ball spline bearing can be made to slide while allowing the torque of the spline shaft to be transmitted to the ball spline bearing.

BRIEF DESCRIPTION OF THE PRIOR ART

The present inventor disclosed in U.S. Pat. No. 4,127,309 issued Nov. 28, 1978 a ball spline bearing assembly in which the contact area between the balls and the raceway surfaces of the outer sleeve is enlarged. In this prior art ball spline bearing assembly, as shown in FIG. 4, each through hole 1 for non-loaded balls 4 is located on the extension of the line connecting the center of the outer sleeve 1 and each of the corresponding loaded balls 3. Therefore, the outer diameter of the ball spline assembly is very large and, therefore a greater expense for the material is required. Furthermore, due to the large outer diameter, many restrictions arise in designing various machines for the adoption of the prior art ball spline assembly. In addition, a large inertial force is exerted onto the spline shaft when it rotates, and, thus, it is necessary to take into consideration the strength of the spline shaft to overcome such a large inertia force.

SUMMARY OF THE INVENTION

With a view to solving the various drawbacks of the prior art the present inventor has devised a ball spline assembly in which through holes for non-loaded balls are formed in an outer sleeve on extensions of lines connecting loaded balls, bearing surfaces are formed on the spline shaft for loaded balls and the non-loaded balls; the contact angle thereof is made as close as possible to the direction of the torque in order to increase the transfer of the force created by the torque. The through holes for the non-loaded balls are formed along the longitudinal axis of the shaft within a distance desired to allow said balls to change their rolling direction into the contact angle; in each of the side walls of a groove of an approximately U-shaped cross-section of the outer sleeve along the longitudinal axis of the shaft a bearing surface for loaded balls is formed. This bearing surface has a curvature similar to that of each of the loaded balls; a ball holder is disposed between said outer sleeve and the shaft, said ball holder defining slits and being provided with a pair of tongues at the two ends of each of said slits so as to prevent loaded balls rolling on the bearing surfaces of said outer sleeve from being dislocated or from falling down; and a pair of end members are provided, each of said end members defining guide grooves necessary for the direction changes of loaded or non-loaded balls which are guided by the said ball holder.

OFJECTS OF THE INVENTION

Thus, an object of this invention is to provide a ball spline assembly in which through holes for non-loaded balls are formed in such a manner that the contact angle, on the extension of a line connecting loaded balls and their corresponding non-loaded balls, is rendered as close as possible to the direction of the torque.

Another object of the present invention is to provide a ball spline assembly in which the bearing surfaces for loaded balls, which are formed by the outer sleeve and its corresponding spline shaft, have a curvature similar to that of the loaded balls, thereby rendering the contact area between the balls and their respective bearing surfaces larger and increasing the torque transfer.

Still another object of this invention is to provide a ball spline assembly in which through holes for non-loaded balls are formed along the direction of the contact angle so as to allow the balls to circulate smoothly and to render the outer idameter of the sleeve smaller thereby making the assembly compact and reducing its production cost.

A further object of this invention is to provide a ball spline assembly in which loaded balls are disposed close to corresponding non-loaded balls in the radial direction, thereby considerably reducing the effect of an inertia force which occurs during high-speed revolutions.

A still further object of the present invention is to provide a ball spline assembly in which the width of each slit of the ball holder is formed narrower than the diameter of the balls and balls do not fall even after pulling the spline shaft out from the outer sleeve. Thus, such an assembly allows extremely easy assembling, maintenance and inspection.

Yet a further object of this invention is to provide a ball spline assembly in which the overall configuration of the ball holder is extremely simple and can be shaped by a metal pressing tool in a few steps. The assembly is further provided with a pair of tongues disposed at the two ends of each slit for scooping up the balls. The tongue portions exhibit excellent wear-resistant properties and a certain rigidity due to the "TOUGHTRIDE" treatement applied thereto. Thus, the end members can be made of a relatively weak material, for example, they can be made of die-cast or injection-molded material thereby allowing a further reduction in the production cost.

Also a further object of this invention is to furnish a ball spline assembly in which angular lash can be reduced to zero by a single bearing, and a pre-load is applied thereto and thus the rigidity of the assembly can be increased.

An also a still further object of this invention is to furnish a ball spline shaft in which a torque is transmitted in the direction of revolution by means of three rows of loaded balls, thereby distributing the load evenly to each row of the balls and assuring a stable performance and a longer work life.

And still another object of the present invention is to provide a ball spline assembly in which the spline shaft is assembled within the ball spline assembly and the extension line X-O'-X' connecting the centers of a loaded ball and its corresponding non-loaded ball is close to the direction of a torque, thereby reducing the outer diameter of the device.

BRIEF DESCRIPTION OF THE DRAWINGS

FIG. 3 is a cross-section taken along line X—X' of FIG. 2; and

FIG. 4 is a cross-sectional view of a conventional ball spline assembly.

DETAILED DESCRIPTION OF THE INVENTION

Figure 1:
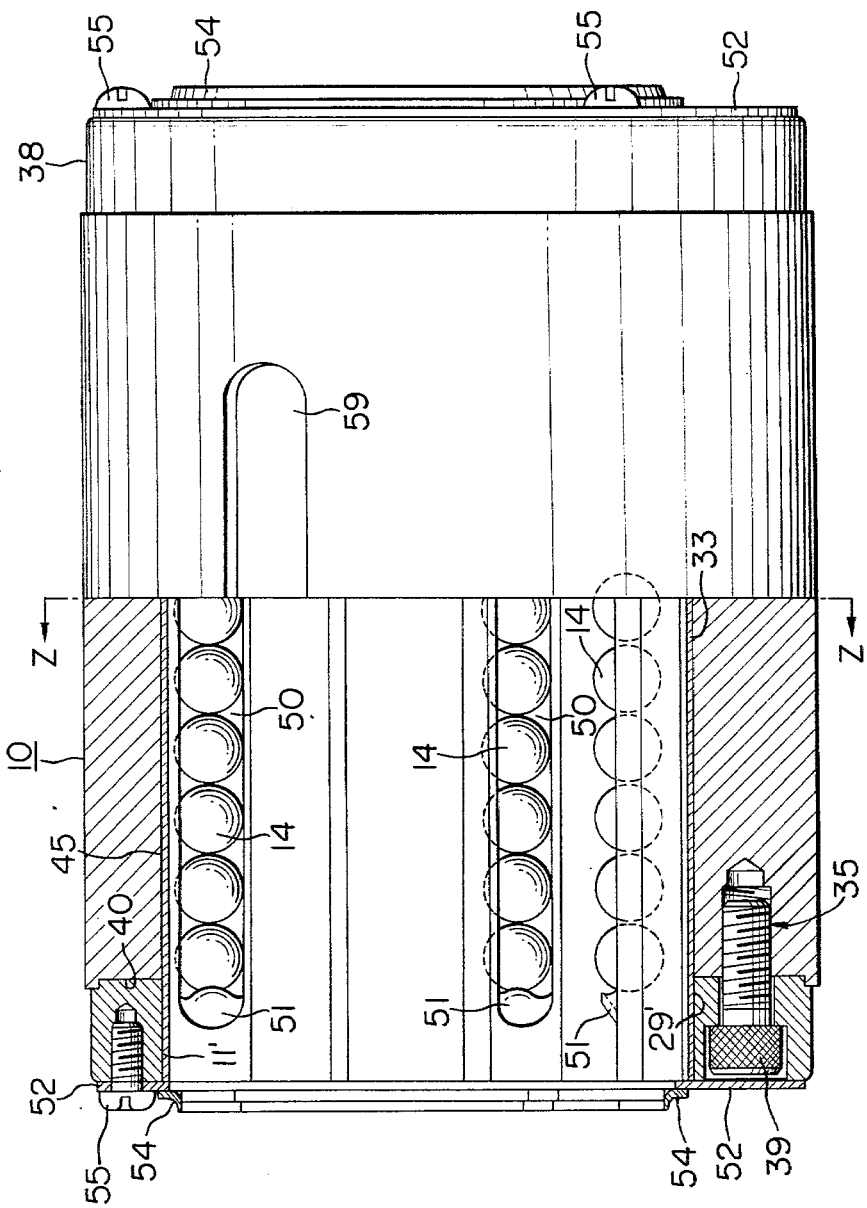
FIG. 1 is a front view of the ball spline assembly of one embodiment according to the present invention, showing the left-hand half portion thereof in a cross-section.

A preferred embodiment of this invention will now explained, making a reference to the appended drawings.

Designated as a whole parts by numeral 10 is an outer sleeve which is provided by cutting into a desired length a cylindrical pipe of a thick wall and made of a metallic material which exhibits high anti-wear properties. The outer sleeve 10 defines in the inside wall surface thereof grooves 11, 12, 13 which have an approximately U-shaped cross-section and extend along the axis of the shaft. The grooves 11, 12, 13 are formed by broach or slotter machining and equally spaced from adjacent grooves.

Next, at both side walls of each of the grooves 11, 12, 13 of the above-described U-shaped cross-section, are formed, by broach or slotter machining and then ball-banishing or grinding, bearing surfaces 15, 16; 17,18; and 19,20 for loaded balls. Each of the bearing surfaces presents a curvature substantially equivalent to the diameter of each loaded ball 14.

Figure 2:
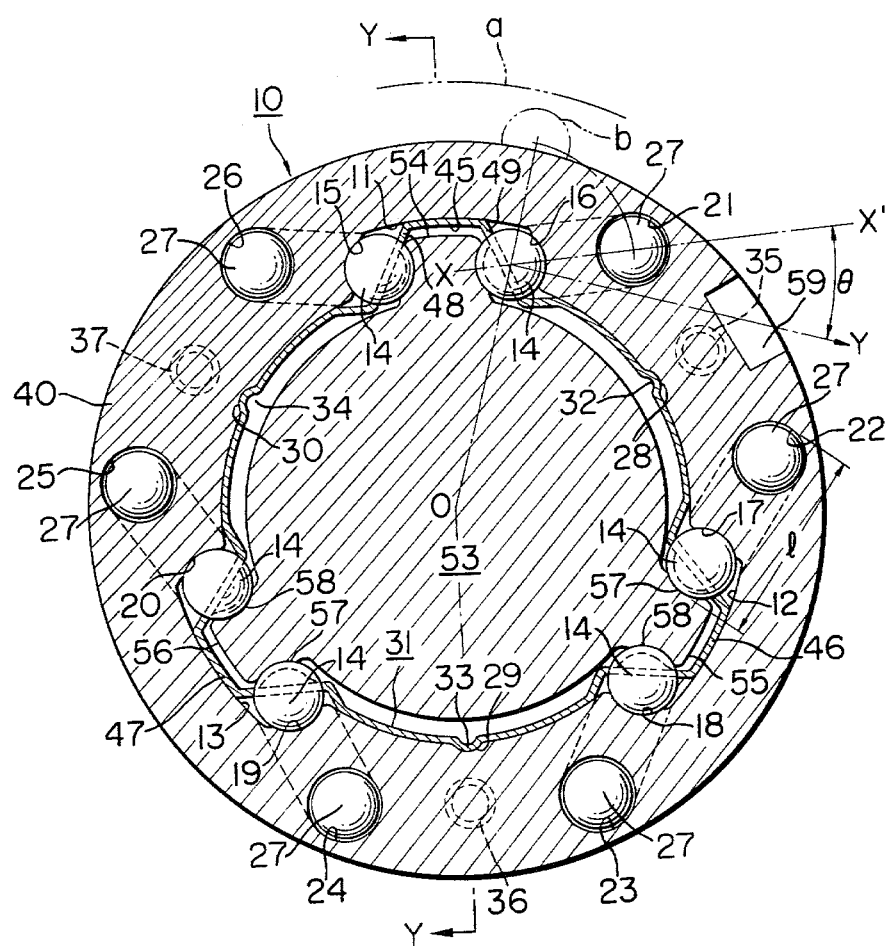
FIG. 2 is a cross-sectional side elevation taken along line Z—Z of FIG. 1.

Numerals 21-26 indicate through holes for non-loaded balls, formed symmetrically with respect to loaded balls 14. It is desirous to form said through holes 21-26 by a multispindle drilling machine in such a manner that each of said through holes 21-26 is located on the extention X-O-X' of the line connecting a loaded ball 14 and the corresponding non-loaded ball 27, its contact angle $\theta$ is formed as close as possible to the direction of torque O-O'-Y, and it is spaced from its respective loaded ball 14 in the direction of the contact angle $\theta$ a distance l required for the direction change of the loaded ball 14 or non-loaded ball 27 (See FIG. 2). At each of the end faces 40, 41 of the outer sleeve 10 which defines said through holes 21-26 for the non-loaded balls and bearing surfaces 15-20 for loaded balls, there are formed semi-circular bearing portions 60,60, ... suitable for guiding the balls 14, 27. The bearing portions are adapted to change the travelling direction of the balls (See FIG. 3).

Designated at numeral 28-30 are rotation-stop grooves for a ball holder 31. Each of the rotation-stop grooves presents a semi-circular groove wall in its transverse cross-section. The rotation-stop grooves 28-30 are formed in the inside wall surface centrally between each two grooves 11, 12, 13 of approximately U-shaped cross-section and extend along the longitudinal axis of the outer sleeve 10. The ball holder 31 is provided with semi-circular protrusions 32-34 formed on the outer periphery thereof. The protrusions 32-34 are allowed to engage with their respective rotation-stop grooves 28-30 (See FIG. 2).

Numerals 35-37 indicate internal threads which are formed in the end faces 40, 41 of the outer sleeve 10. Both end members 38, 38' are fixedly secured to their respective end faces 40, 41 by means of hexagon socket set screws 39 (See FIG. 1).

The end members 38, 38' may be made of a steel material or they may be produced by die-casting or injection molding an appropriate material. Each of said end members 38, 38' defines three grooves 11 of an approximately U-shaped cross-section and grooves 29' of a semi-circular cross-section, similar to the inside wall surface of the outer sleeve 10. Each of said end members 38, 38' also define in the inner surface thereof equally-spaced six grooves 42, 42, ... of a U-shaped cross-section, which are adapted to change the rolling direction of the non-loaded balls 27. Six pairs of guide openings 43, 44 are also formed in the inner surface of each of the end members 38, 38' in such a manner that they are aligned respectively with the openings of their corresponding through holes 21-26 for the non-loaded balls and the openings of their corresponding bearing surfaces 15-20 for loaded balls (See FIGS. 1 and 3).

The ball holder 31 may preferably be formed of a cylindrical body of a thin steel sheet and presents ribs 45, 46,47 of an approximately trapezoidal cross-section, protrusions 32, 33, 34 of a semi-circular cross-section and an outer peripheral surface corresponding to the inside wall surface of the outer sleeve 10. Those ribs 45, 46, 47, protrusions 32, 33, 34 and outer peripheral surface are formed by press-working and bulging said cylindrical body (See FIG. 2).

In each of the inclined surfaces 48, 49 of each of said ribs 45, 46, 47 of the approximately trapezoidal cross-section, is formed a longitudinally extending slit(window) 50 at a position corresponding to its respective bearing surface 15, 16, ... or 20 for loaded balls and a pair of tongues 51, 51 are also formed at both ends of each of said slits 50, 50, .... Said tongues 51, 51, ... are curved to scoop up rolling balls (See FIGS. 1 and 3).

After press-working, the ball holder 31 is subject to the "THOUGHTRIDE" treatment in order to harden the entire surface of the holder and to increase its rigidity.

Retaining plates for the ball holder 31 are indicated at 52. Each retaining plate 52 is made of a steel sheet and is punched into such a shape that some opening is formed between the spline shaft 53 and the plate 52. The opening is closed by a rubber seal 54 which is fixedly secured to its respective retaining plate 52 by baking the same onto the plate (See FIG. 1).

Said retaining plates 52 for the ball holder 31 are fixedly attached to their respective end members 37, 38 by means of screws 55.

The spline shaft 53 is made of steel and presents on the outer peripheral surface thereof equally-spaced three or more ribs 54, 55, 56 which extend along the longitudinal axis of the spline shaft 53. On each of the side walls of each of the ribs 54, 55 56 is formed a bearing surface 57 or 58 for loaded balls, which bearing surface has a radius of curvature substantially the same as that of the loaded balls 14, 14, ...

A key way 59 is formed in the outer peripheral surface of the outer sleeve 10 and is adapted for assembling the ball spline assembly in various machines and apparatus.

The ball spline assembly according to this invention is constituted, roughly speaking, by the outer sleeve 10, end members 38, 38' ball holder 31 and balls 14, 27.

Now, the assembling steps of the ball spling assembly is explained.

First of all, the end member 37 and retaining plate 52 for the ball holder are attached to one end face of the outer sleeve 10. Thereafter, the ball holder 31 is inserted into the outer sleeve 10 and balls (the loaded balls 14 and non-loaded balls 27 are the same balls and merely called so, depending on whether they are in the loaded region or in the non-loaded region within the outer sleeve 10. They are identical to each other both in shape and in size) are filled sequentially in the through holes 21–26 for non-loaded balls and in the spacing between the slits 50 of the ball holder 31 and their respective bearing surfaces for the loaded balls. Then, the other end member 38 and retaining plate 52 for the ball holder are secured on the other end face of the outer sleeve 10 to complete the ball spline assembly.

The operation of the ball spline assembly is now described.

A ball spline assembly according to the present invention is secured to a movable portion of, for example, an industrial machine by means of the key way. Then, a spline shaft is inserted into the thus-secured ball spline assembly and the both ends of said spline shaft are fixedly secured, for example, to the housing of said industrial machine.

As said movable portion moves forward or rearwards, in other words, does a rectilinear motion, loaded balls travel, while rolling, between their respective bearing surfaces of the spline shaft and those of the outer sleeve.

The loaded balls are then introduced into the spacings between the semi-circular bearing portions of the outer sleeve and their respective U-shaped grooves, which are formed in the end members for changing the travelling direction of the balls, as a result of being scopped up by their respective tongues formed at both ends of each slit of the ball holder and pushed forward by following-up balls, and then lead into their respective through holes formed in the outer sleeve for the non-loaded balls.

Non-loaded balls, after being introduced into their respective through holes, travel through the through holes while being pushed by the following-up balls and then pass through the spacings between the semi-circular bearing portions of the outer sleeve and U-shaped grooves formed in the outer end member for changing the travelling direction of the non-loaded balls. Thereafter, the non-loaded balls are guided inwardly along the tongues of the ball holder and then introduced into the spacings between the bearing surfaces of the spline shaft and those of the outer sleeve.

As hereinbefore decribed, the loaded balls travel while rolling between their respective bearing surfaces provided for loaded balls on the outer sleeve and the spline shaft, in response to a rectilinear motion of the outer sleeve. The balls are circulated under rolling motion to their respective through holes formed for non-loaded balls in the outer sleeve via the tongues of the ball holder and U-shaped grooves formed in one of the end members for changing the travelling direction of the loaded balls. To carry out a torque transfer and axial motion via said ball spline assembly, the torque generated by the spline shaft or the outer sleeve causes one or more rows of loaded balls mounted on the outer surface of the spline shaft, said one or more rows of loaded balls being located in the direction of the torque, to axially travel under a rolling motion while carrying out the torque transfer between the outer sleeve and spline shaft.

Since the bearing surfaces for loaded balls, which surfaces are formed on each of the outer sleeve and spline shaft, have a radius of curvature closely similar to that of loaded balls, the contact area of each ball is large and the torque transfer is rendered greater.

The influence of inertia forces during high-speed rotation can be minimized as the loaded balls are close in the radial direction to their respective non-loaded balls.

Furthermore, the entire configuration of the ball holder is extremely simple and can be formed with a metal pressing tool in a few steps. A tongue is formed at each end of each slit for guiding the balls. The tongues exhibit excellent anti-wearing properties and pertain high rigidity because of the "TOUGHTRIDE" treatment applied thereto. Accordingly, the end members can be produced by die-casting or injection-molding a relatively weak material and thus a mass-production of end members is feasible and the manufacturing cost of the ball spline assemblies can be reduced further.

In addition, even a single ball spline assembly of the present invention can minimize or in some instances avoid angular lash and a pre-load can be applied thereto. These features increase the durability of such ball spline assemblies.

Torque is transferred between the outer sleeve and the spline shaft via three rows of loaded balls, which rows are located in the direction of rotation. Therefore, the load is distributed evenly to the three rows of balls and a stable performance and long life-time can be provided.

What is claimed is:

1. In an unlimited sliding ball spline assembly including:
   (a) an outer sleeve (10) with two end faces, and an inside wall;
   (b) two end members (38, 38') fixedly secured to the two end faces;
   (c) a ball holder (31) closely disposed and fixed within a spacing formed by said outer sleeve and the two end members, said ball holder having bearing surfaces, and balls (14, 27), held in said ball holder; in combination:
   (d) a plurality of equally spaced grooves (11, 12, 13) defined in the inside wall of said outer sleeve, said grooves extending along the axis of the sleeve and having an approximately U-shaped cross section, said grooves (11, 12, 13) having side walls and each of said side walls of each of said grooves forming an axially-extending concave bearing surface for loaded balls, said bearing surface having a radius of curvature substantially identical to that of the balls;
   (e) a plurality of through holes (21–26) for non-loaded balls formed in the outer sleeve in such a manner that said through holes are radially and outwardly spaced from their respective bearing surfaces of the outer sleeve, the contact angle of the balls is rendered small so as to make it close to the direction of torque and the through holes are formed in the direction of the contact angle, thereby allowing the outer diameter of the outer sleeve to be formed small;
   (f) a plurality of approximately U-shaped end grooves (42) adapted to change the travelling direction of their respective loaded or non-loaded balls defined in said two end members (38, 38');

(g) a plurality of axial ribs (45, 46, 47) equipped in said ball holder, said axial ribs extending outwards in registration with said grooves (11, 12, 13) formed in the inside wall of the outer sleeve, each of said ribs having a pair of inclined surfaces which are disposed in face-to-face relation with their corresponding bearing surface formed for loaded balls in the side walls of said grooves formed in the inside wall surface of the outer sleeve, each of said inclined surfaces defining therethrough an axially extending slit (50) with ends, said slit being equipped at each end thereof with a tongue (51); and, (h) said balls filling in the through holes, between the bearing surfaces of the outer sleeve and the respective bearing surfaces of the ball holder, as well as the U-shaped end grooves (42) defined in the end members.

2. The unlimited sliding ball spline assembly according to caim 1 wherein a plurality of rotation-stop grooves (28–30) of a semi-circular cross-section are formed in the inside wall surface of the outer sleeve at locations opposite to the grooves (11–13) of U-shaped cross-section with respect to the central axis of the outer sleeve (10).

3. The unlimited sliding ball spline assembly according to claim 1 wherein both end faces (40,41) of the outer sleeve (10) define a plurality of semi-circular bearing portions (60) for guiding their respective balls.

4. The unlimited sliding ball spline assembly according to claim 1 wherein said ribs (45–47) of the ball holder (31) have an approximately trapezoidal transverse cross-section, the outer peripheral surface of each of said ribs (45–47) conforms with the inner surface of its respective groove (11, 12 or 13) which has an approximately U-shaped cross-section and is formed in the inside wall surface of the outer sleeve (10), a plurality of rotation-stop grooves (28–30) of a semi-circular cross-section are formed in the inside wall surface of the outer sleeve (10), and a plurality of protrusions (32–34) of an approximately semi-circular cross-section extend outwardly from the outer periphery of said ball holder at the locations corresponding to said rotation-stop grooves (28–30).

* * * * *